Jan. 25, 1949.  F. E. COX  2,459,872
COUPLING FOR ROUND PIPES AND TUBES
Filed April 5, 1944  2 Sheets-Sheet 1
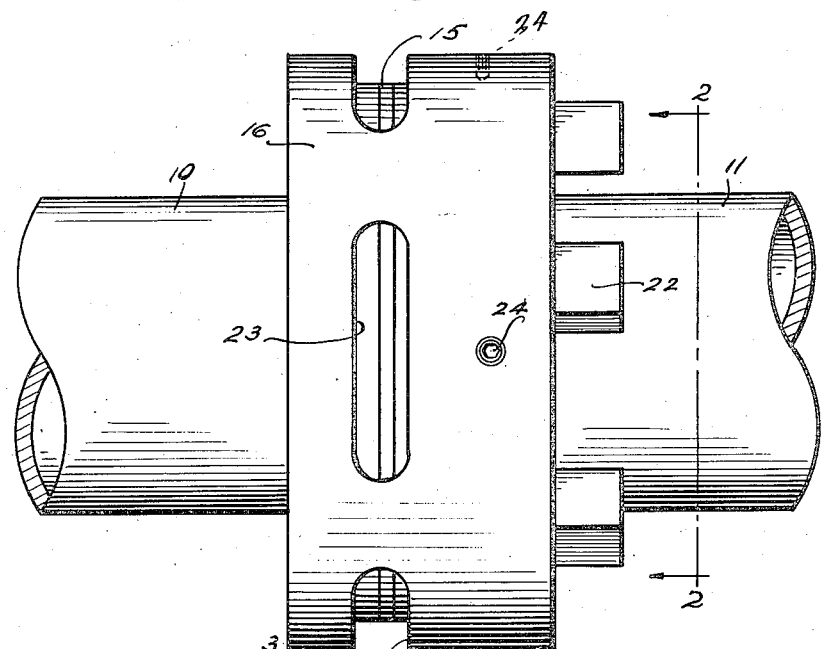
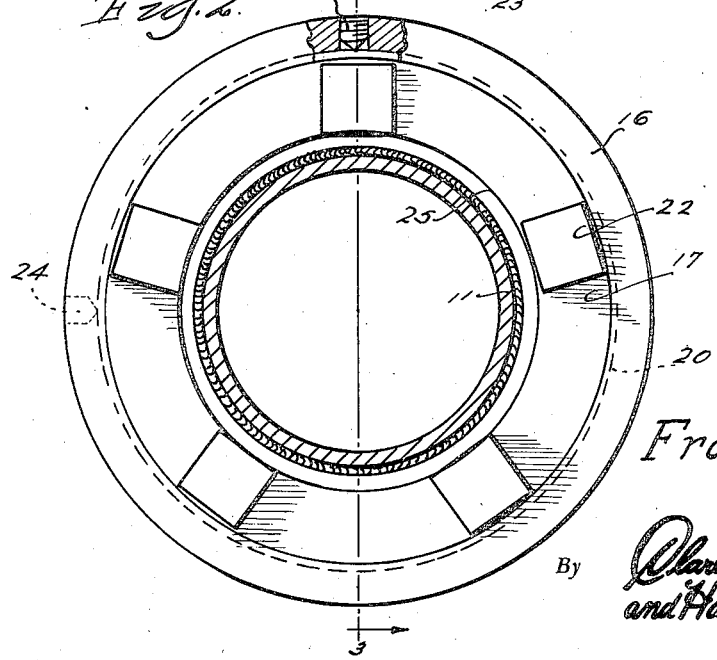
Inventor
Frank E. Cox,
By Clarence A. O'Brien
and Harvey B. Jacobson
Attorneys

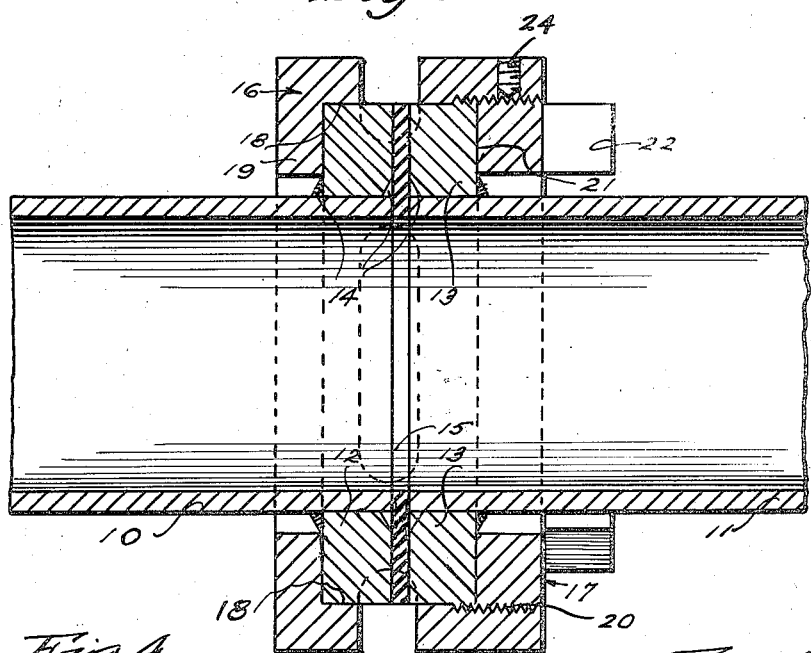
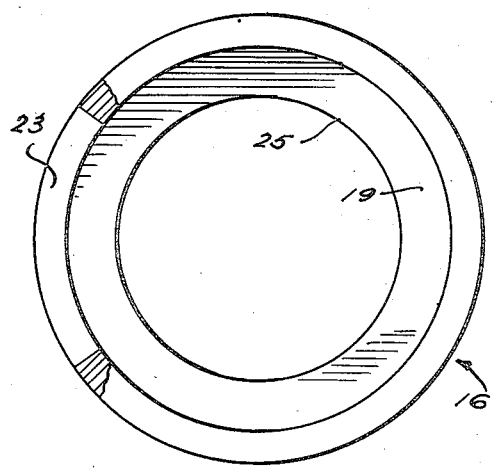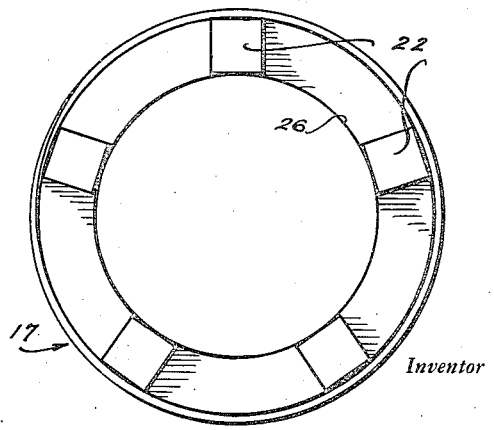

UNITED STATES PATENT OFFICE 2,459,872

COUPLING FOR ROUND PIPES AND TUBES

Frank E. Cox, Brooklyn, N. Y.

Application April 5, 1944, Serial No. 529,653

1 Claim. (Cl. 285—120)

My invention relates to an improved, simplified and very efficient coupling for pipes or tubes.

The object of the invention is to provide a separable coupling for two adjacent pipe or tube ends which is easily applied, easily separated, and which provides a very tight and leak-free connection between the two pipe or tube ends.

In the accompanying drawings one embodiment of the invention is illustrated, and:

Figure 1 shows in side elevation of this coupling connecting the adjacent ends of two tubes or pipes.

Figure 2 is a transverse section along line 2—2 of Figure 1, with parts broken away.

Figure 3 is a section along the line 3—3 of Figure 2.

Figure 4 is an end elevation of the removable outer coupling ring; and

Figure 5 is a similar view of the inner or locking ring of the coupling.

The same parts carry the same reference numerals in the different views.

Reference characters 10 and 11 represent the adjacent ends of two tubes or pipes to be coupled together. At the ends of each tube is provided an annular flange or collar 12 and 13, respectively. These collars originally loose are made integral with the tube ends, as shown, by welding on as at 14 to be firmly united therewith.

Between the collars 12 and 13 is inserted a gasket 15 to make the joint leak-proof when the coupling is applied.

The main parts of the coupling are the following, the removable outer coupling ring or the female coupling member 16, and the inner or locking ring 17 constituting the male coupling member. These rings are preferably cast. The ring 16 is counterbored from its forward end as at 18 to form a recessed seat for the collars 12 and 13, permitting an easy fit, while leaving a ledge or shoulder 19 at its rear end against which the collar 12 abuts. The forward end is able to slide over both collars 12 and 13 and has at its mouth or forward side of the counterbore a threaded portion 20.

The locking ring 17 is similarly threaded so that it may be drawn up tightly against the front face 21 of the collar 13 as best seen in Figure 3.

The coupling member or locking ring 17 is provided around its forward side surface with a number of projections or lugs 22 spaced equally around the surface and having flat shoulders for engagement with correspondingly shaped elements on a suitable wrench or tool for turning the locking ring and screwing it in or out in the bore or recess 18 of the female member or outer ring 16.

The latter is similarly provided with toolholds in the form of a number of elongated slots 23, also reducing weight, arranged around the circumference. As shown these slots go right through the cylindrical wall of the ring into the bore or recess 18 exposing for inspection, the gasket 23. At 24 are shown set screws threaded in the said wall of the female member or outer ring 16 and which, when tightened against the threads 20 of the male member or inner ring 17, prevent relative turning of the two coupling rings. Although two set screws are shown, one may suffice.

The duct, tube or pipe can be made of any diameter and rings can be cast and machined large enough to take care of water-tightness even if they must be increased in size and thickness proportionate to the diameter of the duct or pipe. The rings are cast, then machined and are made up with utility pipe compound. These rings should be put on the pipe loose, before the blank flanges are welded. The pipe with rings on can be galvanized, but care should be taken by the galvanizer to protect the threads in the rings. The male ring has lugs with square shoulders for drawing it tight with a spanner wrench, monkey or socket wrench. This connection will save hardware, cut down cost, and save considerable time in connecting or disconnecting round pipe. These rings can be cast of any material, such as brass, bronze, cast iron or steel, used for ventilation, or water, oil, steam or any type of round pipe where flanges are now used.

The manner of applying this coupling is the following:

After slipping the female ring 16 over the end of the left tube 10 and the male ring 17 over the end of the tube 11 and pushing each back from the pipe end to have room to work between them, the two collars 12 and 13, which have previously been turned to size, are placed one on each tube and flush with the ends. Thereupon these collars are welded in place on both sides as at 14 and dressed off smoothly so as not to reach out further radially in order that the coupling rings can be turned freely around the collars; the inner diameters 25 and 26 of the coupling rings 16 and 17 being for this reason made considerably larger than the outside diameter of the tubes 10 and 11 to be coupled together.

With the collars 12, 13 thus firmly united with the tubes, both coupling rings 16, 17 are pushed toward them after a packing gasket 15 has been inserted between the tube collars which are now contacting. The ledge 19 of the female coupling ring 16 should now abut gainst the rear face of collar 12, while the read end of the male ring 17 stands ready to enter the threads 20. By means of a suitable tool engaging the lugs 22, and while holding the female ring 16 by another tool engaging the slots 23 therein, the two coupling rings are now screwed together until the rear face of ring 17 presses tightly against the front face of the collar 13, thus providing a secure and very tight coupling. Finally the set screws 24 are tightened against the male ring to prevent unscrewing.

That my coupling is efficient and completely leak-free has been proved by actual water tests under high pressure on water pipes 4" in diameter.

It is to be understood that the invention as here disclosed is not limited to the details here described and shown but that the same may be varied widely without departing from the spirit of the invention as defined by the subjoined claim.

Having described the invention, what is claimed as new is:

A coupling for straight, smooth faced pipes and tubes of any size, comprising cylindrical male and female coupling members and a collar fitting flush on the adjacent end of each pipe and a ring weld for permanently securing each collar on its pipe, each of said members adapted for abutting against opposite faces of said two collars and to turn freely on the pipes, a gasket having the same outside diameter as the collars and the same bore as the pipes being inserted between said collars, and means for tightening the coupling members against said collars, said means consisting of interengaging threaded portions on said members, and tightening elements on each of said members, said tightening elements consisting of radial tool slots in the wall of the female member and lugs protruding from said male member lengthways of the pipes, and removable locking means between said coupling members consisting of a radial set screw in the wall of said female members adapted for engaging said male member to prevent relative turning of said members.

FRANK E. COX.

REFERENCES CITED

The following references are of record in the file of this patent:

UNITED STATES PATENTS

| Number | Name | Date |
|---|---|---|
| 265,218 | Chadwick | Sept. 26, 1882 |
| 476,188 | Connor | May 31, 1892 |
| 674,928 | Mauran | May 28, 1901 |
| 715,641 | Cronk | Dec. 9, 1902 |
| 940,870 | Gordon | Nov. 23, 1909 |
| 1,666,802 | Von Allmen | Apr. 17, 1928 |
| 1,736,818 | Aumack | Nov. 26, 1929 |

FOREIGN PATENTS

| Number | Country | Date |
|---|---|---|
| 398,592 | Great Britain | Sept. 21, 1933 |
| 542,026 | Great Britain | Dec. 23, 1941 |
| 494,072 | France | Aug. 29, 1919 |
| 795,459 | France | Mar. 14, 1936 |